(12) United States Patent
Cumberlege et al.

(10) Patent No.: US 6,173,830 B1
(45) Date of Patent: Jan. 16, 2001

(54) TRACKING ASSEMBLY ADAPTED TO BE MOUNTED TO A SUPPORT FRAME OF A CONVEYOR BELT INSTALLATION IN ORDER TO KEEP THE CONVEYOR BELT CENTRALLY ALIGNED

(75) Inventors: John P. Cumberlege, Brackenhurst (ZA); Paul A. Savage, Vaucluse (AU)

(73) Assignee: Tru-Trac Roller (Proprietary) Ltd., Alrode (ZA)

( * ) Notice: Under 35 U.S.C. 154(b), the term of this patent shall be extended for 0 days.

(21) Appl. No.: 09/202,185

(22) PCT Filed: Jun. 10, 1997

(86) PCT No.: PCT/AU97/00364

§ 371 Date: Jan. 19, 2000

§ 102(e) Date: Jan. 19, 2000

(87) PCT Pub. No.: WO97/47538

PCT Pub. Date: Dec. 18, 1997

(30) Foreign Application Priority Data

Jun. 10, 1996 (ZA) ...................................... 96/4918
Jun. 10, 1996 (ZA) ...................................... 96/4919

(51) Int. Cl.⁷ ................................................ B65G 39/10
(52) U.S. Cl. ........................... 198/842; 198/806; 198/808
(58) Field of Search ................................... 198/842, 808, 198/806

(56) References Cited

U.S. PATENT DOCUMENTS 1,572,555 * 2/1926 Nelson ................................. 198/842
1,705,558 * 3/1929 Cuddihy ............................... 198/808
1,963,099 * 6/1934 Robins ................................. 198/806

(List continued on next page.)

FOREIGN PATENT DOCUMENTS

662877 * 5/1963 (CA) .
1102647 * 6/1959 (DE) .
1186398 * 9/1964 (DE) .
28756 * of 1910 (GB) .
1627465 A1 * 2/1991 (GB) .
1812159 A1 * 4/1993 (GR) .

OTHER PUBLICATIONS

WO 96/09237, Cumberlege, PCT application, publication date Mar. 1996.*

* cited by examiner

*Primary Examiner*—Christopher P. Ellis
*Assistant Examiner*—Richard Ridley
(74) *Attorney, Agent, or Firm*—McGuire Woods LLP

(57) ABSTRACT

A tracking assembly for mounting to a support frame of a conveyor belt installation in order to keep the conveyor belt which travels thereon centrally aligned includes a sub-frame adapted to be mounted to a support frame of a conveyor belt installation. A plurality of independently rotatable idlers are mounted for rotation on the sub-frame to support the conveyor belt of the installation in position. The idlers are aligned generally parallel to each other spaced apart from each other across the width of the belt, with the sub-frame and idlers being mounted to the support frame generally transverse to the length of the belt. Each of the idlers include a support shaft, an outer drum rotatably supported on the shaft, and a pivot assembly located within the drum defining a pivot axis about which the drum is pivotable relative to the shaft, the pivot axis being perpendicular to the belt which in use travels on the idler. Adjacent idlers are linked together so as to transmit pivotal movement from one idler to the idler adjacent thereto in such a manner that as one idler pivots through a particular angle the idler adjacent thereto will be caused to pivot through substantially the same angle. Contact means cause the idlers to pivot through a selected angle when the belt supported by the assembly moves off its central path of travel.

13 Claims, 5 Drawing Sheets

U.S. PATENT DOCUMENTS

| | | | | |
|---|---|---|---|---|
| 2,569,419 | * | 9/1951 | Kendall | 198/806 |
| 2,570,364 | * | 10/1951 | Mercier | 198/806 |
| 2,655,251 | * | 10/1953 | Bankauf | 198/808 |
| 3,240,321 | * | 3/1966 | Lo Presti et al. | 198/842 |
| 3,972,414 | * | 8/1976 | Conrad | 198/808 |
| 4,032,002 | * | 6/1977 | Jackson | 198/808 |
| 4,196,803 | * | 4/1980 | Lovett | 198/806 |
| 4,645,071 | * | 2/1987 | Faulkner et al. | 198/842 |
| 5,373,935 | * | 12/1994 | Anderson | 198/808 |

TRACKING ASSEMBLY ADAPTED TO BE MOUNTED TO A SUPPORT FRAME OF A CONVEYOR BELT INSTALLATION IN ORDER TO KEEP THE CONVEYOR BELT CENTRALLY ALIGNED

BACKGROUND TO THE INVENTION

This invention relates to a tracking or training idler assembly which is typically although not exclusively adapted to track a trough shaped belt.

It is well known that conveyor belts tend to drift or creep sideways as they travel along their intended paths. The problem is exacerbated where the belt is particularly long, carries a high load, or is a particularly heavy belt. The problem is further compounded on the load carrying side of the belt where the load is not centrally located on the belt. The load carrying side of the belt is often configured in a trough cross-sectional configuration so as to contain material loaded onto the belt.

To try and keep the belts centrally located (central tracking) it is known to adjust the alignment of either the drive roller or the return roller or both, and thereby keep the path travelling down its central path. However, if the belt is unevenly loaded, or if the belt stretches or wears in use, achievement of central tracking becomes more and more of a problem. A further problem is that it is often found that one part of the belt will tend to track centrally but other parts of the belt along its length tend to drift laterally to one or other side. For this reason it is standard practice to have an operator continuously adjusting the belt or the idlers over which the belt travels to try and achieve central tracking of the belt. High cost automatic pneumatic or hydraulic adjustors are known, but these are not always appropriate to use, particularly in high load mining operations.

To avoid this continual adjustment of the end idlers it is also known to install tracking idlers, which are also know as training idlers, along the length of the conveyor belt which will automatically slew about a vertical axis as the belt moves out of alignment to steer the belt back into its central path. Many different types of idlers of this type are known for tracking flat belts but that tracking or training of trough shaped belts constitutes more of a problem. The following patents indicate attempts to achieve tracking of trough shaped belts:

U.S. Pat. No. 2,815,851
U.S. Pat. No. 1,963,099
U.S. Pat. No. 2,561,641
U.S. Pat. No. 2,109,925
U.S. Pat. No. 1,705,558

The abovementioned patents all basically disclose an arrangement in which three idlers, which are mounted on a sub-frame in a normal trough-like configuration, are mounted so as to lie substantially transverse to the length and direction of travel of the belt. The sub-frame itself is mounted on a pivot axis which is perpendicular to the plane of the belt. Some mechanism is provided towards each edge of the assembly which the edge of the belt will contact as it shifts to one or other side of the assembly. By contacting the mechanism will cause the sub-frame to pivot on its pivot axis and thereby steer the belt back to its central position. Various problems exist, to a great or lesser extent with the different known systems. One problem, for example, is that the mechanism used to pivot the sub-frame has to be contacted by the edge of the belt in order to cause the necessary pivoting. The engagement of the edge of the belt against the mechanism tends to damage the edge of the belt, or the mechanism. Also, the manner in which the sub-frame is mounted to the main structure of the conveyor installation often means that adaptations are needed to be made to the conveyor installation which is undesirable.

A further problem with the tracking assemblies described in the abovementioned patents is that as the assembly pivots, the edge or "wing" idlers tend to move somewhat into the path of the belt which places significant strain on the assembly and decreases the efficacy of the tracking action.

It is desirable that where a training idler is to be installed, this can be done with a minimum of interruptions to the operation where the belt is located. It is also desirable that the training idler assembly is relatively expensive and uncomplicated in operation so that no special maintenance or skilled operator is required to install and maintain the training idler.

SUMMARY OF THE INVENTION

According to a first aspect of the invention there is provided a tracking assembly adapted to be mounted to a support frame of a conveyor belt installation in order to keep the conveyor belt which travels thereon centrally aligned, the tracking idler assembly comprising:

a sub-frame adapted to be mounted to a support frame of a conveyor belt installation;

at least one independently rotatable idler mounted for rotation on the sub-frame, the idler adapted to support a belt of the installation in position, the idler being aligned generally transverse to the length of the belt;

the idler including a support shaft, an outer drum rotatably supported on the shaft, and a pivot assembly located within the drum defining a pivot axis about which the drum is pivotable relative to the shaft, the pivot axis being perpendicular to the belt which in use travels on the idler;

contact means on at least one side of the idler adapted to be contacted by an edge region of a conveyor belt which has travelled from its central position towards that one side;

the contact means being arranged to cause the drum of the idler to pivot about the pivot axis to steer the belt back to its central position.

There is preferably a contact means on each side of the idler. The contact means may form part of, or be detached from the drum.

According to another aspect of the invention there is provided a tracking assembly for mounting to a support frame of a conveyor belt installation, the tracking assembly comprising:

a sub-frame adapted to be mounted to the support frame of a conveyor belt installation;

a plurality of independently rotatable idlers mounted for rotation on the sub-frame, the idlers adapted to support a belt of the installation in position, the idlers being aligned generally parallel to each other spaced apart from each other across the width of the belt, the sub-frame and idlers being mounted to the support frame generally transverse to the length of the belt;

each of the idlers including a support shaft, an outer drum rotatably supported on the shaft, and a pivot assembly located within the drum defining a pivot axis about which the drum is pivotable relative to the shaft, the pivot axis being perpendicular to the belt which in use travels on the idler;

adjacent idlers being linked together via link means adapted to transmit pivotal movement from one idler to the idler adjacent thereto in such a manner that as one idler pivots through a particular angle the idler adjacent thereto will be caused to pivot through substantially the same angle.

The axis of rotation of the idlers need not be co-incident. In one form of the invention the idlers are mounted to the support frame in a troughed configuration comprising at least one centre idler and a pair of side idlers on opposite sides of the centre idler or idlers, the side idlers being inclined relative to the centre idler to define a trough shape support arrangement for a belt. An alternative arrangement will be for the assembly to comprise a pair of idlers mounted in a V-shaped configuration, said link means connecting the two idlers together.

Each of the idlers may include an inner sleeve located co-axially with the drum and a pair of bearing assemblies located on opposite sides of the pivot axis providing for relative rotation between the drum and the sleeve, the pivot assembly connecting the shaft to the sleeve.

The link means may itself be pivotally connected to the sub-frame and will in any event be pivotally connected to each of the idlers. The link means may comprise a rigid bar and it may further include a lost motion facility on one or both ends thereof.

The idler assembly includes contact means for causing the idlers to pivot through a selected angle when the belt which travels over the idler assembly moves off its central path of travel. The means for causing the idlers to pivot may include a reduced diameter end portion on the two outer idlers which comprise the plurality of idlers.

In a preferred form of the invention the reduced diameter portion of the outer two idlers is of a tapered configuration, tapering convergently in a direction away from the centre of the assembly.

According to another aspect of the invention there is provided a tracking assembly for a trough shaped conveyor belt, said assembly including:

at least one centre idler, and a pair of side idlers inclined to the centre idler on opposite ends thereof in a trough configuration;

at least the centre idler including a support shaft, an outer drum rotatably supported on the shaft, and a pivot assembly located within the drum defining a pivot axis about which the drum is pivotable relative to the shaft, the pivot axis being generally perpendicular to the belt;

contact means located at or adjacent the outer edge region of each of the side idlers connected to the centre idler and adapted to cause the outer drum of the centre idler to pivot about said pivot axis when a belt travelling on the assembly moves to one or other side of the assembly and into contact with the contact means, thereby causing the belt to be steered by the centre idler back to a centre position on the assembly.

The contact means may be incorporated into the side idlers, or may be independent of the side idlers.

The invention also extends to an idler for a tracking idler assembly according to the invention.

According to a yet further aspect of the invention there is provided a tracking assembly for mounting to a support frame of a conveyor belt installation, the tracking assembly comprising:

a sub-frame adapted to be mounted fixedly to a support frame of a conveyor belt installation;

at least three rotatable idlers supported on the sub-frame including at least a centre idler and a pair of outer idlers, the idlers adapted to support a travelling belt in position, the idlers being aligned with their axes of rotation generally parallel to each other, the idlers being spaced apart from each other across the width of the belt;

the sub-frame and idlers adapted to be mounted to the support frame generally transverse to the length of the belt, the centre one of the idlers including a support shaft, an outer drum which is rotatably supported on the shaft, and a pivot assembly located within the drum defining a pivot axis about which the drum is pivotable relative to the shaft, the pivot axis being generally perpendicular to the belt, the centre idler being supported on the sub-frame via its shaft;

the outer idlers being independently rotatably mounted to the centre idler drum so that pivoting of the centre idler drum about its pivot axis will carry with it the outer idlers on either side thereof;

the arrangement being such that a belt travelling on the assembly which runs off-centre to the extent that one longitudinal edge of the belt rides on the outer idler on that side to a greater extent than the opposite longitudinal edge of the belt is riding on the outer idler on opposite side thereof will create an uneven force on the assembly which will cause the idlers to pivot about the pivot axis and steer the belt back to its central path.

The central idler preferably includes an inner sleeve co-axially mounted within the drum and through which the shaft extends, a pivot pin connecting the sleeve to the shaft, and bearing means rotatably mounting the drum to the inner sleeve. The outer idlers are preferably mounted to that inner sleeve. The outer idlers may be detachably mounted to the inner sleeve via a detachable elbow bracket. The elbow bracket may be angularly adjustable so as to allow for variations in belt width and trough configuration.

According to another aspect of the invention there is provided a tracking assembly for mounting to a support frame of a conveyor belt installation, the tracking assembly comprising:

a sub-frame adapted to be mounted fixedly to a support frame of a conveyor belt installation;

a central idler supported on the support frame adapted to support a travelling belt, the idler adapted to be mounted to the support frame generally transverse to the length of the belt;

the centre idler including a support shaft, an outer drum which is rotatably supported on the shaft, and a pivot assembly located within the drum defining a pivot axis about which the drum is pivotable relative to the shaft, the pivot axis being generally perpendicular to the belt, the centre idler being supported on the sub-frame via its shaft;

a pair of arms on opposite sides of the centre idler, said arms being mounted to the central idler so as to pivot therewith; and wing brakes mounted at or near the free ends of each of the arms;

said brakes being adapted to be contracted by a belt which travels over the central idler and shifts to a predetermined extent off its central path, the effect, when the brakes are so contacted being to cause the central idler to pivot about said pivot axis into an orientation adapted to steer the belt back to a central path.

The wing brakes may be rotatable. Alternatively the wing brakes may be pads. The arms may be flexible.

Various embodiments of the invention are described in detail in the following passages of the specification which refer to the accompanying drawings. The drawings, however, are merely illustrative of how the invention might be put into effect, so that the specific form and arrangement of the various features shown should not be understood to be limiting on the invention.

DETAILED DESCRIPTION

Figure 1:
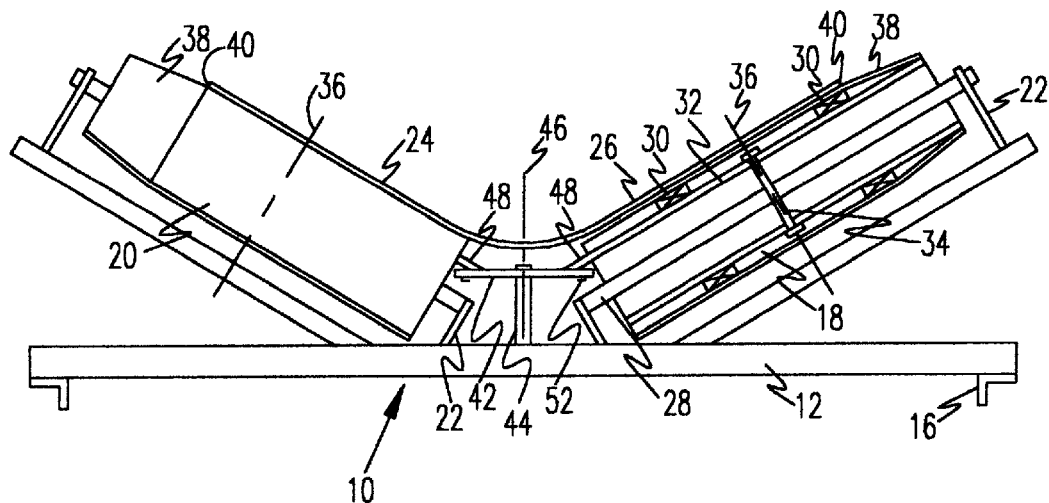
FIG. 1 shows a part cut-away side view of a first embodiment of the invention.
Figure 2:
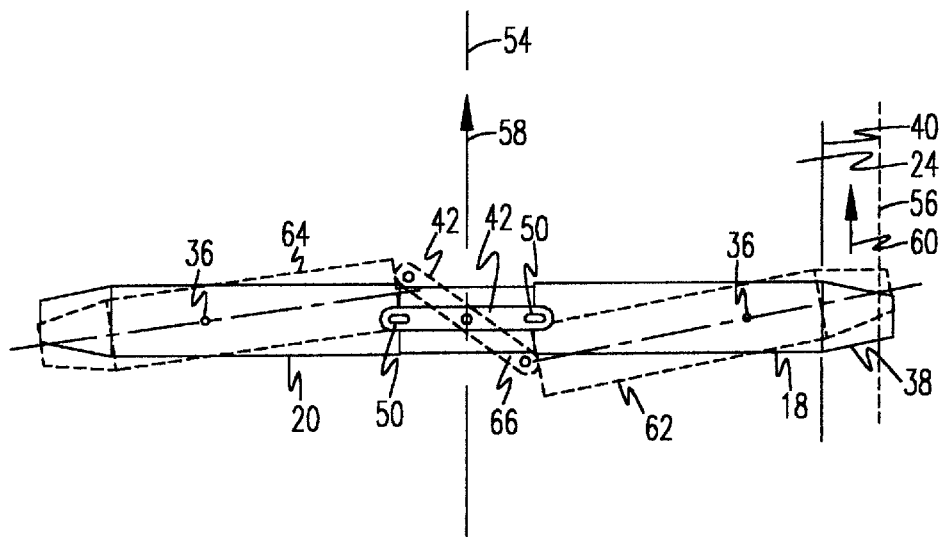
FIG. 2 shows a plan view of the assembly shown in FIG. 1.

Referring initially to FIGS. 1 and 2, a tracking idler assembly 10 comprises a sub-frame 12 which is adapted to be mounted via bolts 14 to the support frame 16 of a conveyor belt installation. The sub-frame 12, in this embodiment, supports a pair of idlers numbered 18 and 20 which are rotatably connected the sub-frame 12 via brackets 22. It will be noted that the idlers 18 and 20 are mounted in a V-shaped configuration so that the belt 24 supported by the idlers adopts a V-shaped trough-like configuration. As shown in FIG. 1, idlers 18 and 20 each comprise a drum 26 which is rotatably mounted on a shaft 28 via bearings 30. The bearings 30 have an inner race which is mounted on an inner sleeve 32 co-axially located within the drum 26. The inner sleeve 32 is pivotably mounted via a pin 34 to the shaft 28 so that for each idler, the drum 26, and the sleeve 32 are able to pivot about the pin 34 on respective pivot axes 36. The pivot axes 36 are basically perpendicular to the plane of the belt 24 where the belt is in contact with each of the idlers 18 and 20.

Each of the idlers 18 and 20 has an outer portion indicated at numeral 38 which tapers convergently in a direction away from the centre of the assembly. The tapered outer portions 38 in this embodiment extend for between one quarter and one third of the length of the drums. In the preferred arrangement, with the belt centrally located on the assembly, the longitudinal edges 40 of the belt ride approximately at the start of the tapered outer portion 38 of the drums. The angle of taper will be between about 0.5° and 10°, depending on the required responsiveness of the assembly. The outer portions need not be tapered. An alternative arrangement would be for the outer portions to step down to a smaller diameter.

The idlers 18 and 20 are linked together via a link bar 42 which is mounted via a post 44 to the sub-frame 12. The link bar 42 is pivotable relative to the post about a pivot axis 46. The inner sleeve 32 of each of the idlers 18 and 20 includes an extension 48 which connects to the respective opposite ends of the link bar 42. As will be clear from FIG. 2 of the drawings, the link bar 42 has a pair of slots 50 therein, the slots being aligned with the length of the bar 42. The extensions 48 each include a pin 52 located in the slots 50. The effect of this link arrangement provided by the link pin 42, will be that if one of the idlers 18 or 20 is caused to pivot on its pivot axis 36 that pivotal movement will be transferred, via the link bar 42 to the other idler. The purpose of this linking arrangement is to cause the two idlers to pivot about their respective axes 36 through the same angle when steering the belt, as described in more detail herebelow.

Referring specifically to FIG. 2, the manner in which the idlers pivot as the belt drifts to one or other side as described in detail. As shown in FIG. 2 the central path of the belt is indicated by dotted line 54. As the belt travels to one side of the assembly, as indicated by dotted line 56, the edge 40 of the belt will contact the tapered outer portion 38 of idler 18. Since the tapered outer portion 38 is of smaller diameter then the inner portion of the idler 18, that tapered outer portion will be rotating at a lower peripheral speed than will the inner portion of the idler. The belt, travelling in the direction of arrow 58 will therefor be in simultaneous contact with two parts of the idler travelling at different peripheral speeds. The effect will be to create a force on the idler 18 indicated by arrow 60. That force will cause the idler 18 to pivot about its pivot axis 36 to the position indicated by dotted lines 62.

Since the idlers 18 and 20 are linked together by link bar 42 the pivoting or slewing of the idler 18 will cause the idler 20 to adopt a similarly slewed orientation as indicated by dotted lines 64. The link bar 42 will adopt an angular orientation as indicated by dotted lines 66. The slots 50 are provided to accommodate the angular movement of the idlers 18 and 20, the pins 52 moving along the length of the slots 50. It will be noted that idlers 18 and 20 will be slewed or pivoted through the same angle.

With the idlers 18 and 20 pivoted into the positions indicated by dotted lines 62 and 64 respectively the belt 24 will be steered back to its central position 54. It may in practice move slightly beyond that central position but then the idlers 18 and 20 will pivot marginally into the opposite angular orientation whereafter the belt will be repositioned back in its central path 54 and the idlers will adopt an orientation which is perpendicular to the direction of travel 58 of the belt. Movement of the belt to either side of the idler assembly will therefore cause the two idlers to pivot, as described above, out of perpendicular alignment to steer the belt back to its centre position.

Figure 3:
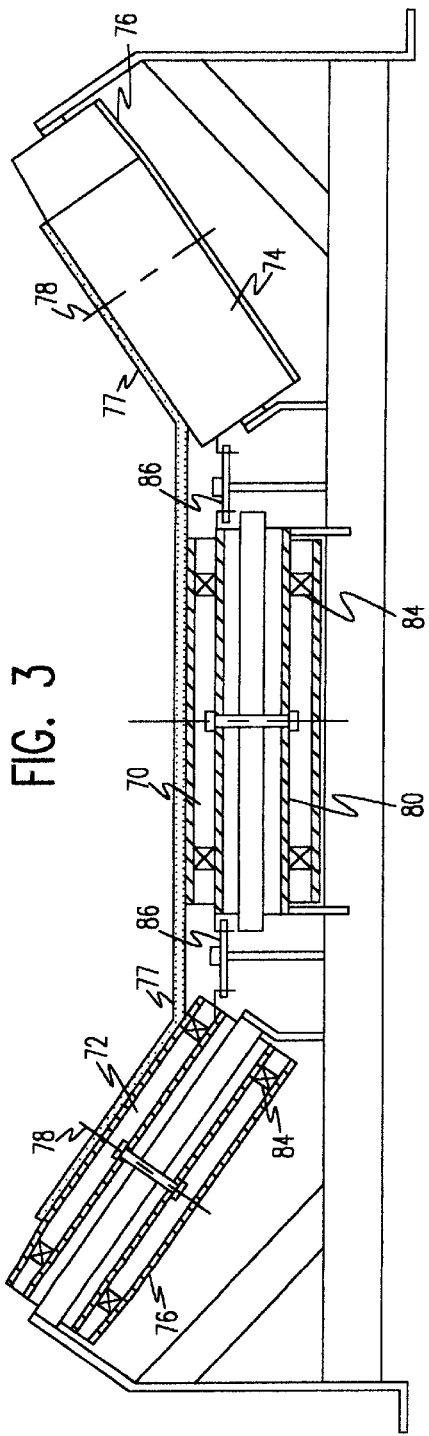
FIG. 3 shows a side view of a second embodiment of the invention.
Figure 4:
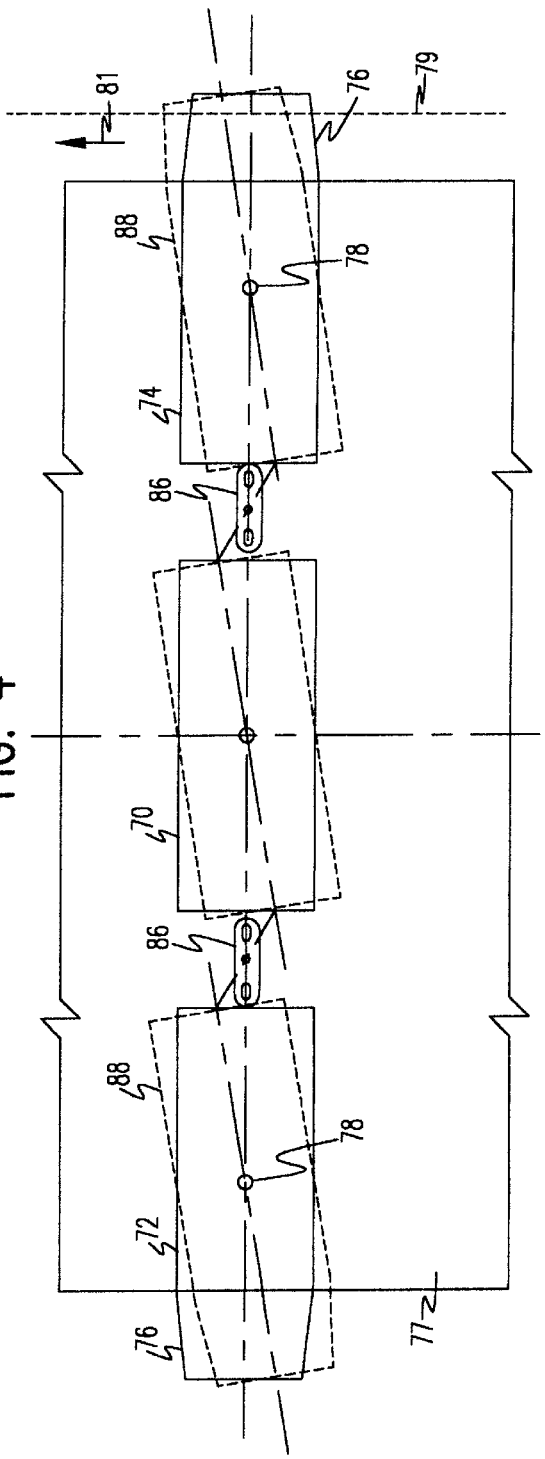
FIG. 4 shows a plan view of the embodiment shown in FIG. 3.

Turning now to FIGS. 3 and 4 of the drawings, a similar arrangement to that of the previous embodiment is shown but for a three idler trough configured assembly. This arrangement need not be described in detail since the principle of operation is basically the same. In this arrangement the assembly includes a centre idler 70 and a pair of side or wing idlers 72 and 74. The side idlers 72 and 74 each have a tapered end portion 76 and when the belt 77 rides onto the respective tapered end portions 76 the side idlers will pivot about their pivot axes 78 as described above. Each of the idlers 70, 72 and 74 have an inner sleeve 80 and an outer drum 82. The drums 82 of the respective idlers are mounted via bearings 84 to these inner sleeves 80. Thus, the inner sleeves 80 do not rotate whereas the drums 82 rotate and therefore are able to support the travelling belt 77.

The outer idlers 72 and 74 are connected to the central idler 70 by link bars 86 pivotally mounted on posts 87. The link bars 86 connect the inner sleeves 80 of the side idlers 72 and 74 to the inner sleeve of the central idler 70. The belt 77, as shown in FIG. 2, moves laterally onto the tapered end portion 76, as indicated by dotted lines 79 in FIG. 4. This will tend to pull the outer end portion of that idler forward, that is, in the direction of travel of the belt, as indicated by arrow 81. The effect of this will be that pivoting of the idlers 74, as a consequence of the belt 77 travelling onto the tapered portion 76 of that idler, will be transferred to the centre idler 70 and to the other side idler 72, in a manner indicated by dotted lines 88 in FIG. 4 of the drawings.

Once the idlers are in the condition indicated by dotted lines 88 the belt will be steered back by all three idlers into its central position whereafter the idlers will adopt an orientation perpendicular to the direction of travel of the belt. The links 86, in each case, will keep the idlers in the same angular orientation relative to each other and ensure that the three idlers act in unison to steer the belt back to its centre position.

In practice it is found that the centre idler 70 is the idler which has the most marked steering effect on the belt and therefore by transferring of the pivoting movement from the side idler to the centre idler the superior steering characteristics of the centre idler can be utilised. The two pivoted side idlers will have the effect of steering one side of the belt up, out of the trough, and the other side of the belt down, into the trough, until the belt is back in its centre position.

A slightly different arrangement of tracking idler assembly for trough belts will now be described with reference to FIGS. 5 to 9 of the drawings.

Figure 5:
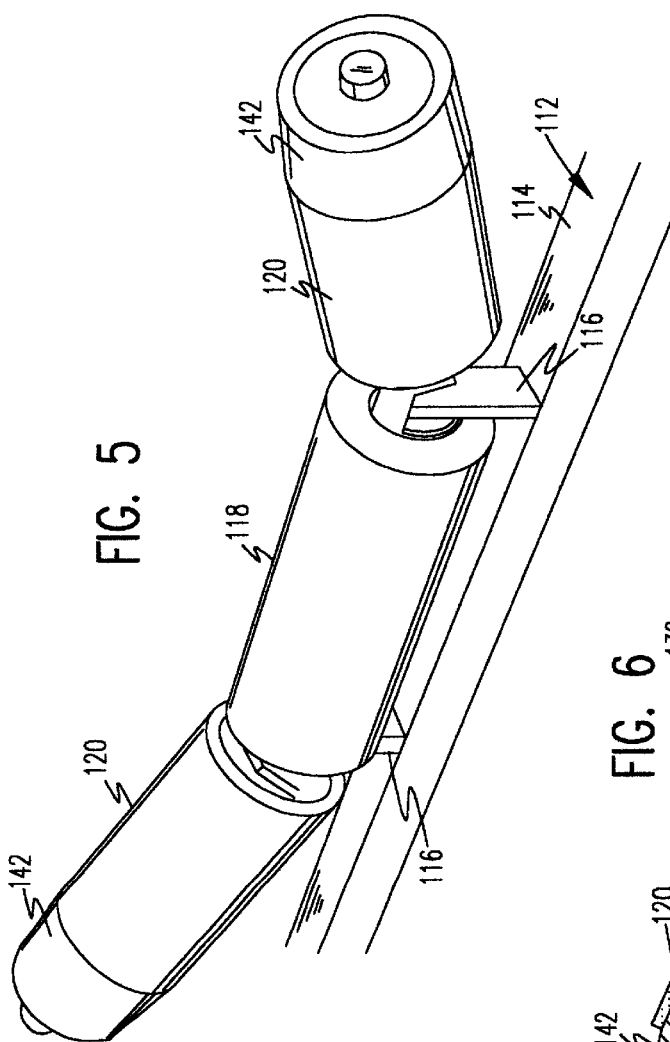
FIG. 5 shows a perspective view of another embodiment of a tracking idler assembly according to the invention.
Figure 6:
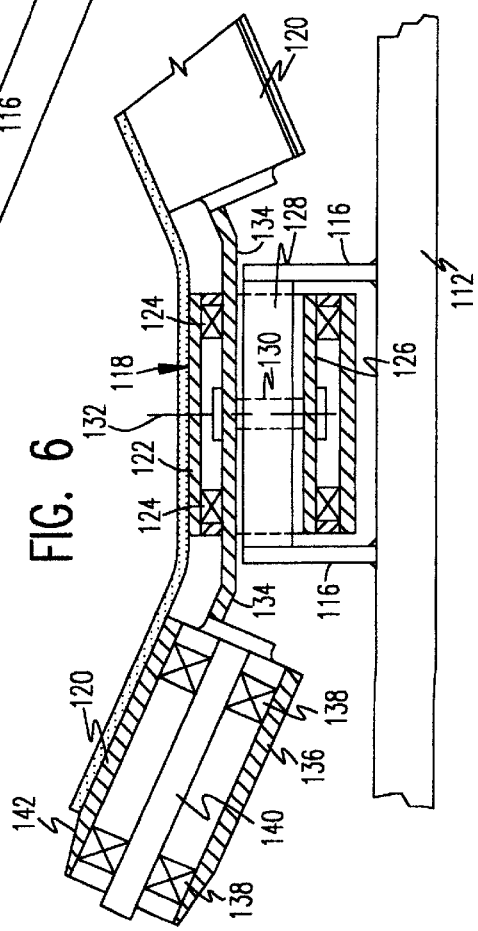
FIG. 6 shows a cross-sectional side view of the tracking idler shown in FIG. 5.
Figure 7:
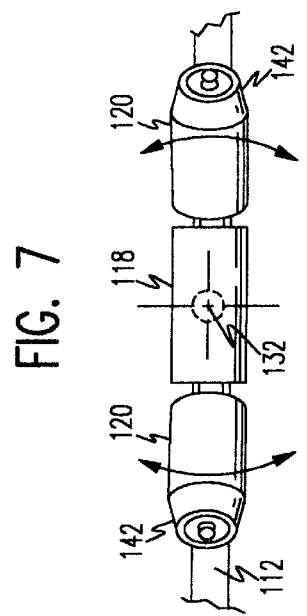
FIG. 7 shows a diagrammatic plan view of the assembly shown in FIG. 5.

As shown in FIGS. 5 to 7 the drawings, a tracking idler assembly 110 comprises a sub-frame 112 which in use will be mounted to the support frame of a conveyor belt installation (not shown). The sub-frame 112 includes a cross-bar 114 and a pair of upstanding support arms 116. The idler assembly comprises three idlers, namely a central idler 118 and a pair of outer or wing idlers 120. The centre idler 118 comprises a drum 122 which is rotationally supported via bearings 124, on an inner sleeve 126. A shaft 128 extends axially through the centre of the inner sleeve 126 and a pivot pin 130 extends perpendicularly through the shaft 128 and is connected at opposite ends thereof to the inner sleeve 126. The pivot pin 130 defines a pivot axis 132 about which the sleeve 126, and with the sleeve the drum 122 is able to pivot about the pivot axis 132. The pivot axis is generally perpendicular to the plane of the belt at the point where the belt rides over the centre idler.

The outer idlers 120 are mounted via angle brackets 134 to the sleeve 126 in cantilever fashion. The outer idlers 120, as shown in FIG. 2, comprise an outer drum 136 supported on bearings 138 to a shaft 140 and the angle brackets 134 are connected to the shaft 140 so that the drums 136 are rotatable relative to the shafts 140 and hence are rotatable relative to the angle brackets 134.

The outer portions 142 of the outer idlers 120 taper convergently in a direction away from the central idler 118. It is envisaged that the taper will extend for approximately one third the length of the outer idlers 120 although the taper could indeed extend for the full length of the idlers 120. The angle of taper will generally be reasonably shallow. It is not envisaged that the angle of taper need be greater than approximately 5°. The preferred angle of taper is between 0.5° and 2°. An alternative arrangement will be for the outer portions 142 to step down to a smaller diameter which will achieve substantially the same effect as a taper as described herebelow.

It will be appreciated that because of the convergent nature of the taper, the outer end portion of the outer idlers has a rotational speed which is less than the rotational speed of the inner portion 143 of those idlers. A step down to a reduced diameter would have the same effect. The inner portion 143 of the idlers will be travelling at a peripheral speed which is greater than that of the outer portion 142. The effect of this will be that the belt riding over the outer portion will tend to pull the outer portion 142 forward, that is, in the direction in which the belt is travelling. The net effect will be that an uneven force will be applied to the assembly by the belt causing the assembly to pivot about the pivot axis 132 to a position in which the idlers steer the belt back to its centre position.

It is envisaged that when the belt is in its centre position the edge regions of the belt will run just adjacent to or just touching the tapered end portions of both of the two outer idlers. When in this central position (shown in FIG. 6) the belt will be tracking centrally along the assembly and the centre idler 118 should therefore be perpendicular to the direction of travel of the belt. Where the belt drifts to one side, the edge of the belt on that side will move up the tapered end portion of the outer idler on that side. As the edge of the belt travels onto the tapered end portion which, is rotating at a slower peripheral speed, the effect will be to apply a force to that idler, dragging the outer part of the idler forward, thereby causing the assembly to pivot about axis 132, as described above. The pivoted idler assembly will steer the belt back to its central position.

As the belt moves back towards its central position it will move back up the other outer idler until such time as the belt is central. The assembly will then pivot back to its position perpendicular to the direction of travel of the belt. Applicant has found that with the pivot axis located within the centre of the centre idler, pivotal movement is significantly easier to achieve than other arrangements in which the pivot assembly is located below the centre idler. This is a significant difference over prior art assemblies. Also, with the pivot arrangement located within the central idler, it is found that dust and dirt which would otherwise tend to clog the pivot arrangement, tends not to cause these problems.

Furthermore, since the assembly of the invention does not require a pivoting sub-frame, substantially standard components can be used which means that no alteration to the support frame of the conveyor installation need be made.

It is also envisaged that the outer idler 120 can be removably fitted to the angle bracket 134. A simple clip arrangement could be provided which will allow the outer idlers 120 to be replaced as and when required. Optionally the angle bracket 134 is angularly adjustable to accommodate different trough configurations. In the preferred form of the invention the outer idlers are displaced slightly from the edge of the belt but at a steeper angle than the side angle of the blet. Thus when the belt is travelling centrally it will not contact either edge idler. However, when the belt moves to one side it will contact the edge idler on that side causing the aforementioned pivoting movement of the centre idler. The edge idler on the other side will, however, be spaced some distance from the belt at this point, and will thus be able to pivot "into" the line of the belt without interference.

Figure 8:
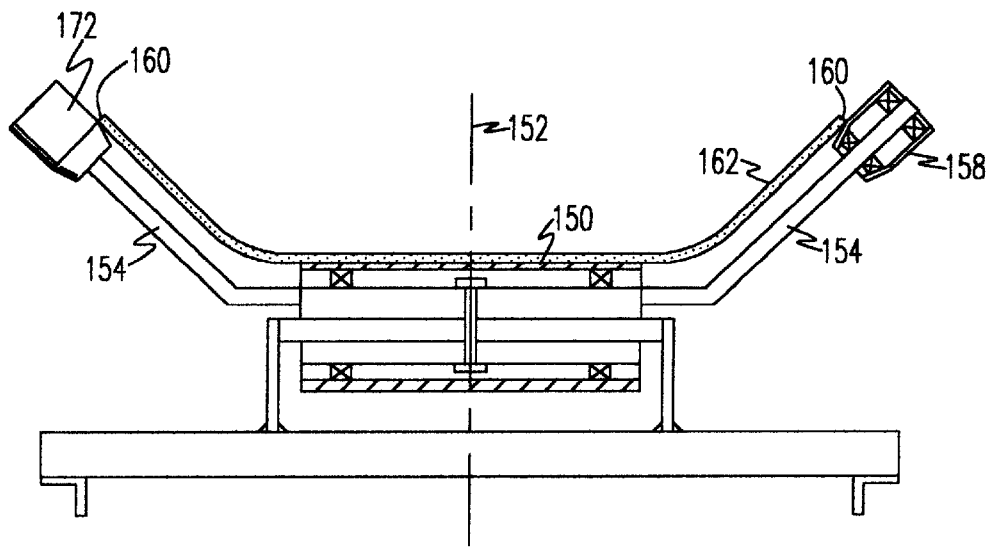
FIG. 8 shows a sectional side view of a further embodiment of the tracking idler assembly.
Figure 9:
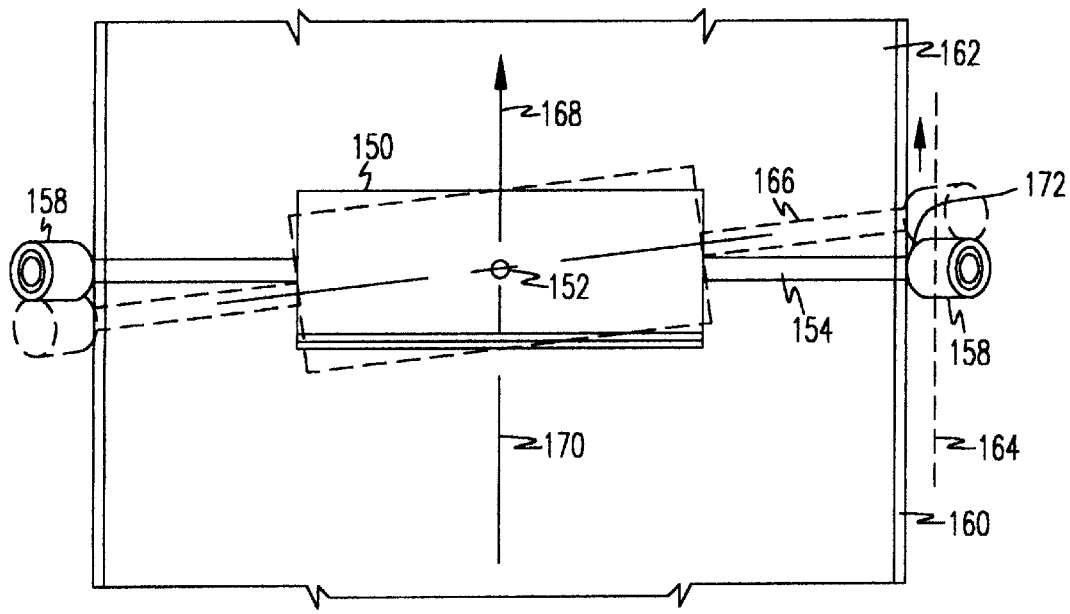
FIG. 9 shows a plan view of the assembly shown in FIG. 8.

A further option would be to replace the outer idlers with simple wing "brakes" connected to the centre idler as shown in FIGS. 8 and 9 of the drawings. As shown, a centre idler 150 which includes a pivot arrangement similar to that of the previous embodiment, is pivotable about pivot axis 152. A pair of arms 154 are connected to the central sleeve 156 of the centre idler and these arms carry side rollers 158 on the free ends thereof. These rollers are angled slightly relative to the plane of the edges of the belt 162.

As the belt 162 shifts laterally to one side, as indicated by dotted lines 164, the edge 160 of the belt on that side will contact the roller 158, the effect being to cause the roller assembly, and arms, to pivot as indicated by dotted lines 166. It will be noted that the centre roller 150 pivots to a position which is no longer perpendicular to the direction of travel 168 of the belt and in so doing will steer the belt back to its central path, as indicated by dotted lines 170. Once the belt reaches its central position 170 the assembly will pivot back to its perpendicular position and will remain perpendicular to the direction of travel of the belt until such time as the belt shifts to one or other side again.

The arms 154 may be flexible to accommodate any vibration in the belt, but since in normal use the arms 154 will not carry any significant load, it is not envisaged that any significant load will be placed on the central idler 150, or the pivot arrangement. It will be noted that the side rollers 158 have a tapered inner portion indicated at numeral 72 to facilitate the edge of the belt riding onto those side rollers when the belt shifts one or other side.

Figure 10:
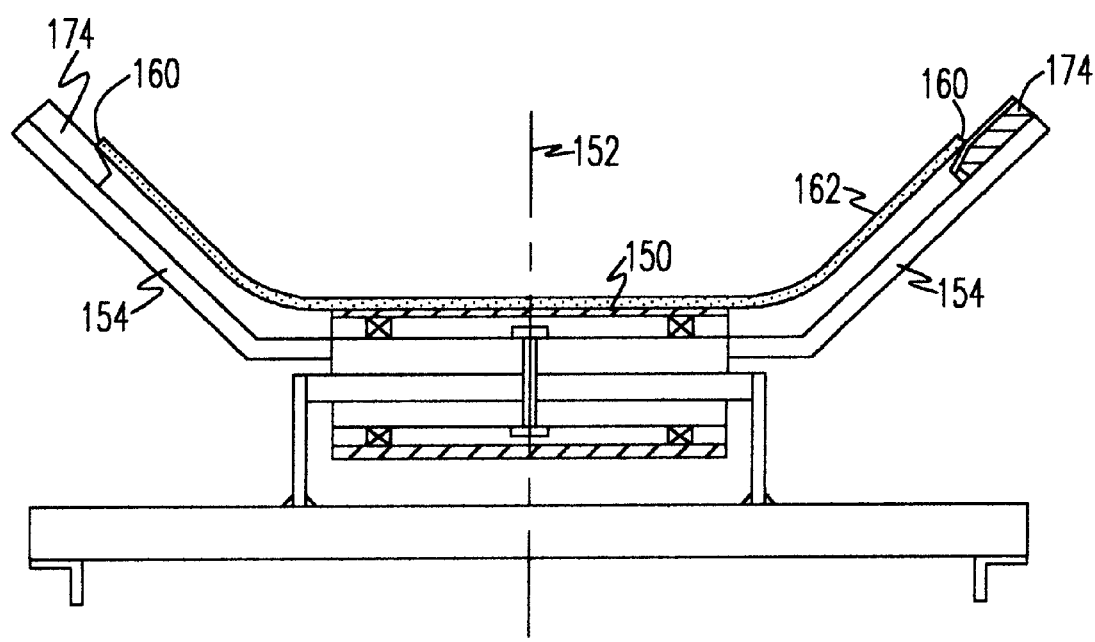
FIG. 10 shows a sectional side view of a further embodiment of the tracking idler assembly.

It is not essential for the "brakes" as provided by rollers 158 to in fact be rollers as such. The rollers 158 may, for example, be replaced by a pad 174 or the like fitted to the end of the arms 154 which will be contacted by the belt when the belt shifts to one or other side as shown in FIG. 10. The point is that the "brakes" at the free ends of the arms 154 must, when the belt shifts to one or other side, act to cause the central roller 150 to pivot about its pivot axis 152 and thereby steer the belt back to its central position.

It is found in practice that the central idler 150 is, in any three idler trough support arrangement, the idler which has the most effect in steering the belt. It is thus important that in any system the central idler is caused to pivot in order to steer the belt back to its central position.

It will be understood that various different "contact means" described herein can be arranged at the edges of either a single idler, or at the edges of a plurality of aligned idlers which, when contacted by the edge of an off-line belt will cause the idler or all idlers in an assembly to pivot to an angled position in order to steer the belt back to its central position. The invention is thus not limited to the embodiments described herein. However, it is found that the central pivot within the tracking idler allows for low force pivoting which enables the tracking assembly to steer the belt back to its central position rather than requiring it to be forced into its central position as is the case with the types of prior art assemblies referred to in the Background section of this specification.

What is claimed is:

1. A tracking assembly for mounting to a support frame of a conveyor belt installation, the tracking assembly comprising:

a sub-frame adapted to be mounted to a support frame of a conveyor belt installation;

a plurality of independently rotatable idlers mounted for rotation on the sub-frame, the idlers adapted to support a belt of the installation in position, the idlers being aligned generally parallel to each other spaced apart from each other across the width of the belt, the sub-frame and idlers being mounted to the support frame generally transverse to the length of the belt;

each of the idlers including a support shaft, an outer drum rotatable supported on the shaft, and a pivot assembly located within the drum defining a pivot axis about which the drum is pivotable relative to the shaft, the pivot axis being perpendicular to the belt which in use travels on the idler;

adjacent idlers being linked together via link means adapted to transmit pivotal movement from one idler to the idler adjacent thereto in such a manner that as one idler pivots through a particular angle the idler adjacent thereto will be caused to pivot through substantially the same angle; and contact means for causing the idlers to pivot through a selected angle when the belt supported by the assembly moves off its central path of travel, wherein the contact means comprises a reduced diameter end portion.

2. A tracking assembly according claim 1 wherein the axis of rotation of the idlers are not co-incident.

3. A tracking assembly according to claim 2 wherein the idlers are mounted to the support frame in a troughed configuration comprising at least one centre idler and a pair of side idlers on opposite sides of the centre idler or idlers, the side idlers being inclined relative to the centre idler to define a trough shape support arrangement for a belt.

4. A tracking assembly according to claim 2 wherein the assembly comprises a pair of idlers mounted in a V-shaped configuration, the link means connecting the two idlers together.

5. A tracking assembly according to claim 1 wherein each of the idlers includes an inner sleeve located co-axially with the drum and a pair of bearing assemblies located on opposite sides of the pivot axis, said bearing assemblies providing for relative rotation between the drum and the sleeve, the pivot assembly connecting the shaft to the sleeve.

6. A tracking assembly according to claim 1 wherein the link means is pivotally connected to the sub-frame and is pivotally connected to each of the idlers.

7. A tracking assembly according to claim 6 wherein the link means comprises a rigid bar which include a lost motion facility on at least one end thereof.

8. A tracking assembly according to claim 1 wherein the reduced diameter end portion is of a tapered configuration, tapering convergently in a direction away from the centre of the assembly.

9. A tracking assembly for mounting to a support frame of a conveyor belt installation, the tracking assembly comprising:

a sub-frame adapted to be mounted fixedly to a support frame of a conveyor belt installation;

at least three rotatable idlers supported on the sub-frame including at least a center idler and a pair of outer idlers, the idlers adapted to support a traveling belt in position, the idlers being aligned with their axes of rotation generally parallel to each other, the idlers being spaced apart from each other across the width of the belt;

the sub-frame and idlers adapted to be mounted to the support frame generally transverse to the length of the belt;

the center one of the idlers including a support shaft, an outer drum which is rotatably supported on the shaft, and a pivot assembly located within the drum defining a pivot axis about which the drum is pivotable relative to the shaft, the pivot axis being generally perpendicular to the belt, the center idler being supported on the sub-frame via its shaft;

the outer idlers being independently rotatable mounted and connected to the center idler drum so that pivoting of the center idler drum about its pivot axis will carry with it the outer idlers on either side thereof;

the arrangement being such that a belt traveling on the assembly which runs off-center to the extent that one longitudinal edge of the belt rides on the outer idler on that side to a greater extent than the opposite longitudinal edge of the belt is riding on the outer idler on opposite side thereof will create an uneven force on the assembly which will cause the idlers to pivot about the pivot axis and steer the belt back to its central path;

the center idler including an inner sleeve co-axially mounted within the drum and through which the shaft extends, a pivot pin connecting the sleeve to the shaft, and bearing means rotatably mounting the drum to the inner sleeve, wherein the outer idlers are mounted to that inner sleeve.

10. A tracking assembly for mounting to a support frame of a conveyor belt installation, the tracking assembly comprising:

a sub-frame adapted to be mounted fixedly to a support frame of a conveyor belt installation;

at least three rotatable idlers supported on the sub-frame including at least a center idler and a pair of outer idlers, the idlers adapted to support a traveling belt in position, the idlers being aligned with their axes of rotation generally parallel to each other, the idlers being spaced apart from each other across the width of the belt;

the sub-frame and idlers adapted to be mounted to the support frame generally transverse to the length of the belt;

the center one of the idlers including a support shaft, an outer drum which is rotatable supported on the shaft, and a pivot assembly located within the drum defining a pivot axis about which the drum is pivotable relative to the shaft, the pivot axis being generally perpendicular to the belt, the center idler being supported on the sub-frame via its shaft;

the outer idlers being independently rotatable mounted and connected to the center idler drum so that pivoting of the center idler drum about its pivot axis will carry with it the outer idlers on either side thereof;

the arrangement being such that a belt traveling on the assembly which runs off-center to the extent that one longitudinal edge of the belt rides on the outer idler on that side to a greater extent than the opposite longitudinal edge of the belt is riding on the outer idler on opposite side thereof will create an uneven force on the assembly which will cause the idlers to pivot about the pivot axis and steer the belt back to its central path;

the center idler including an inner sleeve co-axially mounted within the drum and through which the shaft extends, a pivot pin connecting the sleeve to the shaft, and bearing means rotatably mounting the drum to the inner sleeve, wherein the outer idlers are detachably mounted to the inner sleeve via a detachable elbow bracket.

11. A tacking assembly according to claim 10 wherein the detachable elbow bracket is angularly adjustable so as to allow for variations in belt width and trough configuration.

12. A tracking assembly for a support frame of a conveyor belt installation, the tracking assembly comprising:

a sub-frame adapted to be mounted fixedly to a support frame of a conveyor belt installation;

a central idler supported on the support frame adapted to support a traveling belt, the idler adapted to be mounted to the support frame generally transverse to the length of the belt;

the center idler including a support shaft, an outer drum which is rotatable supported on the shaft, and a pivot assembly located within the drum defining a pivot axis about which the drum is pivotable relative to the shaft, the pivot axis being generally perpendicular to the belt, the center idler being supported on the sub-frame via its shaft;

a pair of arms on opposite sides of the center idler, said arms being mounted to the central idler so as to pivot therewith; and brakes mounted at or near free ends of each of the arms, wherein the brakes comprise non-rotatable pads;

said brakes being adapted to be contracted by a belt which travels over the central idler and shifts to a predetermined extent off its central path, the effect, when the brakes are so contacted being to cause the central idler to pivot bout said pivot axis into an orientation adapted to steer the belt back to a central path.

13. A tracking assembly according to claim 12 wherein the arms are flexible.

* * * * *